US012264595B2

(12) United States Patent
Lefebvre et al.

(10) Patent No.: US 12,264,595 B2
(45) Date of Patent: Apr. 1, 2025

(54) TURBINE SUPPORT CASE HAVING AXIAL SPOKES

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 99 days.

(21) Appl. No.: 18/344,054

(22) Filed: Jun. 29, 2023

(65) Prior Publication Data

US 2025/0003354 A1 Jan. 2, 2025

(51) Int. Cl.
*F01D 25/24* (2006.01)

(52) U.S. Cl.
CPC ........ *F01D 25/246* (2013.01); *F05D 2240/14* (2013.01); *F05D 2260/31* (2013.01)

(58) Field of Classification Search
CPC .... F01D 25/246; F01D 9/026; F05D 2240/14; F05D 2260/31; F05D 2220/40; F05D 2230/642; F01C 21/10; F01C 1/22; F01C 11/008; F01C 21/18; F01N 13/1844; F02B 41/10; F02B 53/02; F02B 2053/005; F02C 5/06; F02C 6/12; F04C 2240/806
See application file for complete search history.

(56) References Cited

U.S. PATENT DOCUMENTS

| | | | | |
|---|---|---|---|---|
| 2,421,833 | A | 6/1947 | Cronstedt et al. | |
| 3,738,105 | A | 6/1973 | Buchelt | |
| 4,250,711 | A * | 2/1981 | Zehnder | F02M 26/23 60/278 |
| 5,105,625 | A | 4/1992 | Bell, III et al. | |
| 5,156,534 | A | 10/1992 | Burgy et al. | |
| 5,987,877 | A * | 11/1999 | Steiner | F02C 7/14 60/39.83 |
| 6,968,697 | B2 * | 11/2005 | Nguyen | F02C 7/06 60/785 |
| 7,093,448 | B2 | 8/2006 | Nguyen et al. | |

(Continued)

FOREIGN PATENT DOCUMENTS

| | | | |
|---|---|---|---|
| DE | 102014012123 | A1 | 2/2016 |
| JP | 2002349276 | A | 12/2002 |

(Continued)

*Primary Examiner* — Matthew T Largi
(74) *Attorney, Agent, or Firm* — NORTON ROSE FULBRIGHT CANADA LLP

(57) ABSTRACT

An aircraft engine, has: a turbine including a turbine rotor rotatable about a central axis; a scroll case having an inlet fluidly connected to a source of combustion gases and an outlet fluidly connected to the turbine, and a conduit extending around the central axis from the inlet to the outlet, the conduit spiraling towards the central axis; a bearing housing extending around the central axis; an exhaust case disposed downstream of the turbine; and a turbine support case secured to the bearing housing and to the exhaust case, the turbine support case having spokes distributed around the central axis and extending along a direction having an axial component relative to the central axis, the spokes extending through the conduit of the scroll case and radially supported by the bearing housing.

20 Claims, 10 Drawing Sheets

(56) References Cited

U.S. PATENT DOCUMENTS

| | | | | |
|---|---|---|---|---|
| 7,731,426 | B2 * | 6/2010 | Meacham | F16C 27/04 384/535 |
| 7,931,437 | B1 | 4/2011 | Johnson | |
| 8,272,203 | B2 * | 9/2012 | Derenes | F02K 3/06 60/797 |
| 9,896,998 | B2 * | 2/2018 | Thomassin | F02B 41/00 |
| 9,970,295 | B2 | 5/2018 | Fontaine et al. | |
| 9,982,561 | B2 | 5/2018 | Budnick et al. | |
| 10,196,971 | B2 * | 2/2019 | Thomassin | F02B 53/14 |
| 10,677,086 | B2 | 6/2020 | Kobayashi et al. | |
| 10,815,832 | B2 | 10/2020 | Staffier et al. | |
| 11,187,149 | B2 | 11/2021 | Kobielski et al. | |
| 11,643,218 | B2 | 5/2023 | Blagojevic | |
| 11,821,361 | B1 * | 11/2023 | Lefebvre | F02C 7/04 |
| 12,065,950 | B1 * | 8/2024 | Lefebvre | F01D 25/24 |
| 2011/0008162 | A1 | 1/2011 | Yokoyama et al. | |
| 2011/0311355 | A1 | 12/2011 | Benkler et al. | |
| 2013/0064655 | A1 | 3/2013 | Smatloch et al. | |
| 2013/0156567 | A1 | 6/2013 | Nagae et al. | |
| 2014/0020381 | A1 * | 1/2014 | Bolduc | F01C 11/008 60/273 |
| 2014/0373555 | A1 * | 12/2014 | Beier | F02C 7/32 60/796 |
| 2017/0204743 | A1 | 7/2017 | Yokoyama et al. | |
| 2017/0218760 | A1 * | 8/2017 | Fontaine | F01C 11/008 |
| 2018/0216494 | A1 | 8/2018 | Azuma et al. | |
| 2019/0316516 | A1 | 10/2019 | Arai | |
| 2020/0182257 | A1 | 6/2020 | Uemura et al. | |
| 2020/0200073 | A1 | 6/2020 | Uemura et al. | |

FOREIGN PATENT DOCUMENTS

| | | | |
|---|---|---|---|
| JP | 3757999 | B2 | 3/2006 |
| JP | 4370232 | B2 | 11/2009 |
| WO | 2016184549 | A1 | 11/2016 |
| WO | 2016184550 | A1 | 11/2016 |

* cited by examiner

TURBINE SUPPORT CASE HAVING AXIAL SPOKES

TECHNICAL FIELD

The disclosure relates generally to turbomachinery and, more particularly, to a turbine support case for such engines.

BACKGROUND

In some engine architectures, aerodynamic flow distributors, such as scroll or volute structures, are used to receive combustion gases and to regulate them in a suitable manner before the combustion gases meet stator vanes or rotor blades of the downstream turbine(s). Such structures are subjected to thermal growth, which may have some various effects on surrounding components. Improvements are therefore sought.

SUMMARY

In one aspect, there is provided an aircraft engine, comprising: a turbine including a turbine rotor rotatable about a central axis; a scroll case having an inlet fluidly connected to a source of combustion gases and an outlet fluidly connected to the turbine, and a conduit extending around the central axis from the inlet to the outlet, the conduit spiraling towards the central axis; a bearing housing extending around the central axis; an exhaust case disposed downstream of the turbine; and a turbine support case secured to the bearing housing and to the exhaust case, the turbine support case having spokes distributed around the central axis and extending along a direction having an axial component relative to the central axis, the spokes extending through the conduit of the scroll case and radially supported by the bearing housing.

The aircraft engine described above may include any of the following features, in any combinations.

In some embodiments, the scroll case includes vanes extending in a direction having an axial component relative to the central axis and across the conduit.

In some embodiments, each of the spokes extends within a respective one of the vanes.

In some embodiments, the spokes are free of connection to the vanes.

In some embodiments, the turbine support case defines a load path from the bearing housing to the exhaust case, the load path independent from the scroll case.

In some embodiments, the scroll case is free from direct connection to the turbine support case.

In some embodiments, an annular member is secured to the bearing housing and extending around the central axis, distal ends of the spokes secured to the annular member.

In some embodiments, the annular member includes a peripheral tab extending axially relative to the central axis, the distal ends of the spokes radially supported by the peripheral tab.

In some embodiments, the turbine support case includes a wall extending around the central axis, the spokes protruding from the wall.

In some embodiments, the wall axially overlaps at least a portion of the turbine, the turbine support case having a rear flange secured to a flange of the exhaust case.

In some embodiments, a containment ring is secured to the rear flange of the turbine support case and disposed radially between the wall of the turbine support case and the turbine rotor of the turbine.

In some embodiments, the turbine is an axial turbine having an axial inlet, and wherein the outlet of the scroll case is annular and axially faces the axial inlet of the turbine, the conduit of the scroll case being disposed axially forwardly of the turbine.

In another aspect, there is provided a turbine assembly, comprising: a turbine including a turbine rotor rotatable about a central axis; a support structure; a scroll case for receiving combustion gases and for directing the combustion gases to the turbine, the scroll case having a conduit extending around the central axis, the conduit spiraling towards the central axis; and a turbine support case having spokes distributed around the central axis, the spokes extending through the conduit of the scroll case and radially supported by the support structure, wherein a load path extends through the turbine support case independently of the scroll case.

The turbine assembly described above may include any of the following features, in any combinations.

In some embodiments, the scroll case includes vanes extending in a direction having an axial component relative to the central axis across the conduit.

In some embodiments, each of the spokes extends within a respective one of the vanes.

In some embodiments, the spokes are free of connection to the vanes.

In some embodiments, the scroll case is free from direct connection to the turbine support case.

In some embodiments, an annular member is secured to the support structure and extending around the central axis, distal ends of the spokes radially secured to the annular member.

In some embodiments, the annular member includes a peripheral flange extending axially relative to the central axis, the distal ends of the spokes radially supported by the peripheral flange.

In some embodiments, the turbine support case includes a wall extending around the central axis, the spokes protruding from the wall.

BRIEF DESCRIPTION OF THE DRAWINGS

Reference is now made to the accompanying figures in which.

DETAILED DESCRIPTION

Figure 1:
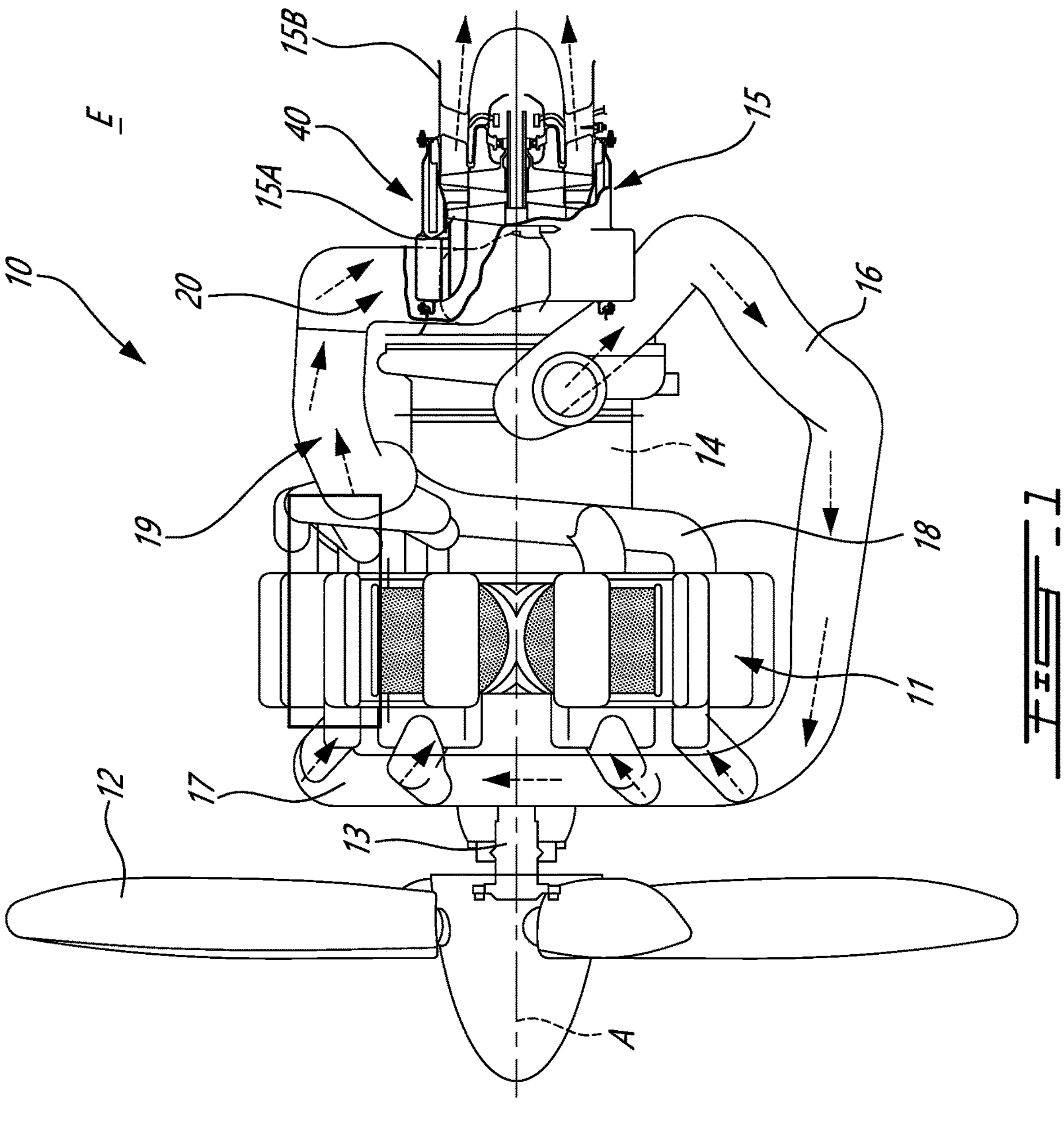
FIG. 1 is a schematic side view of an aircraft engine in accordance with one embodiment.

Referring to FIG. 1, an aircraft engine 10 is schematically shown. The aircraft engine 10 comprises a thermal engine module 11 including one or more internal combustion engine(s), drivingly engaged to a rotatable load 12, herein depicted as a propeller, via an output shaft 13. The output shaft 13 may correspond to an engine shaft of the thermal engine module 11. The thermal engine module 11 may include any engine having at least one combustion chamber of varying volume. For instance, the thermal engine module 11 may comprise one or more piston engine(s) or one or more rotary engine(s) (e.g., Wankel engines). The aircraft engine 10 further includes a compressor 14 having a compressor inlet receiving ambient air from the environment E outside the aircraft engine 10 and a compressor outlet fluidly connected to an air inlet of the thermal engine module 11. The compressor 14 outputs compressed air from the compressor outlet to the thermal engine via a compressed air conduit 16 and a manifold 17. The compressed air conduit 16 and the manifold 17 may include any suitable arrangement of pipes configured to distribute compressed air between the different combustion chambers of the thermal engine module 11. Any other suitable configurations used to supply compressed air to the thermal engine module 11 are contemplated without departing from the scope of the present disclosure. The aircraft engine 10 further includes a turbine/assembly 15 having an axially facing turbine inlet 15A fluidly connected to an engine outlet of the thermal engine module 11. The turbine 15 has a turbine exhaust case 15B via which combustion gases are expelled to the environment E. The turbine exhaust case 15B may include a tailpipe or any other suitable structures (e.g., exhaust mixer) for discharging the combustion gases from the aircraft engine 10.

Figure 2:
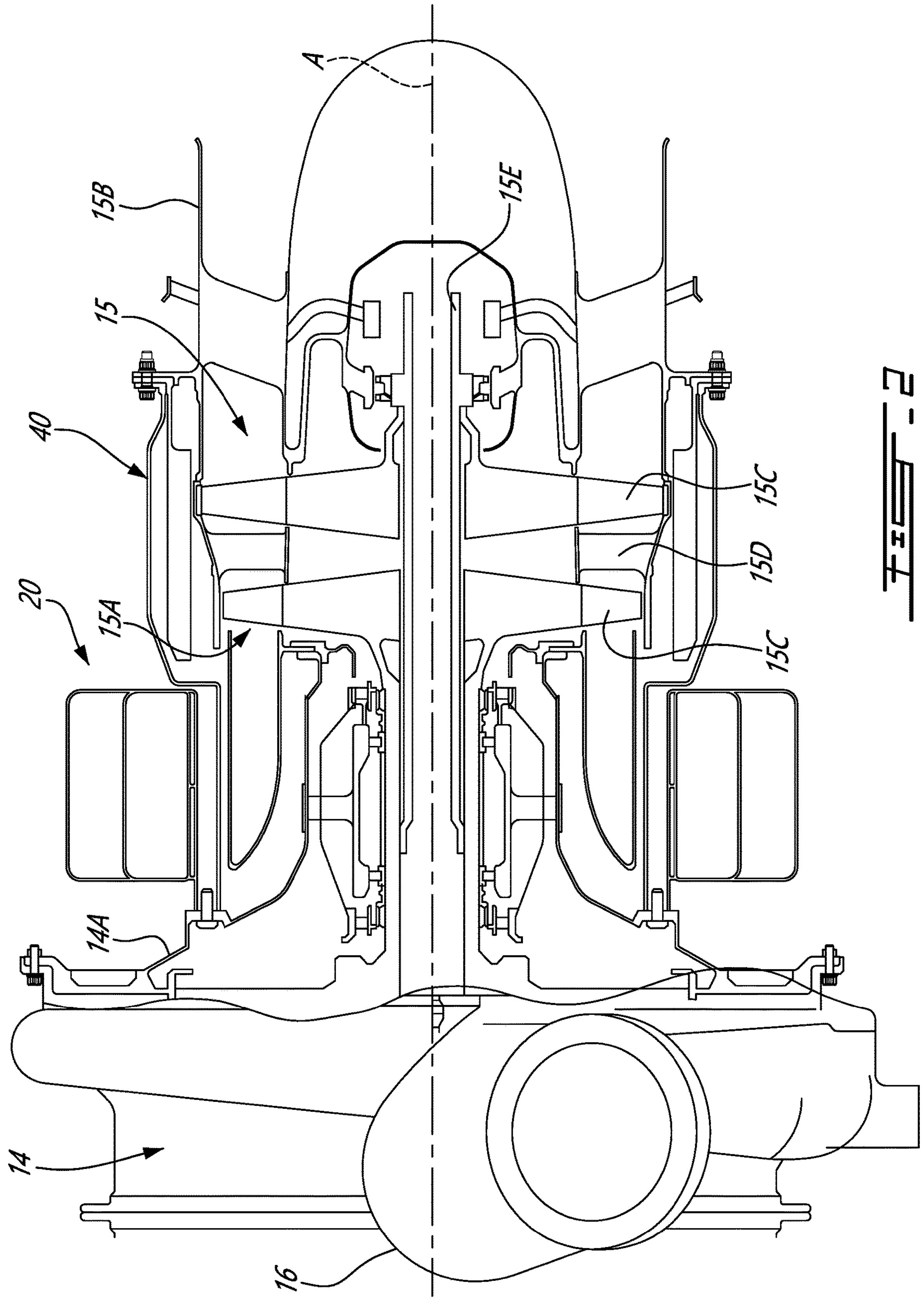
FIG. 2 is a side cross-sectional view of a portion of the aircraft engine of FIG. 1 illustrating a hot section of the aircraft engine.

Referring to FIGS. 1-2, in one or more embodiment(s), the turbine 15 includes an axial turbine having successive rows of rotor(s) 15C and stator(s) 15D disposed in alternation along a central axis A of the aircraft engine 10. The rotor(s) 15C may include rotor blades mounted to rotor discs. The stator(s) 15D may include stator vanes secured at opposite ends to inner and outer shrouds. In other words, the turbine 15 may include a plurality of stages each including a stator and a rotor. The rotors 15C of the turbine 15 are in driving engagement with a turbine shaft 15E. The turbine shaft 15E may be drivingly engaged to the output shaft 13, which may correspond to the engine shaft of the thermal engine module 11. Therefore, the turbine 15 may compound power with the thermal engine module 11 to drive the rotatable load 12. In other words, the turbine shaft 15E may be drivingly engaged to the engine shaft of the thermal engine module 11 via suitable gearing. In the embodiment shown, the turbine shaft 15E is drivingly engaged to a compressor shaft of the compressor 14. Thus, the turbine 15 may drive both the rotatable load 12 and the compressor 14. In the exemplified embodiment, the engine shaft of the thermal engine module 11, the output shaft 13, and the turbine shaft 15E are all coaxial about the central axis A. However, in other configurations, the turbine 15 and/or the compressor 14 may have respective shafts radially offset from one another relative to the central axis A.

As shown in FIG. 1, the engine outlet of the thermal engine module 11 is fluidly connected to an exhaust manifold 18 that receives combustion gases outputted by the combustion chambers of the thermal engine module 11. The exhaust manifold 18 collects the combustion gases from the different combustion chambers and flows these combustion gases to a combustion engine exhaust pipe 19 that feeds the combustion gases to the turbine 15. In other words, the engine outlet of the thermal engine module 11 is fluidly connected to the turbine inlet 15A via the exhaust manifold 18 and the combustion engine exhaust pipe 19. Any other suitable configurations used to supply combustion gases to the turbine 15 are contemplated without departing from the scope of the present disclosure.

As schematically depicted by the flow arrows in FIG. 1, the combustion gases are flowing within the combustion engine exhaust pipe 19 and reach the turbine 15 in a direction being mainly radial and which may include a circumferential component relative to the central axis A. However, the turbine 15 includes an axial turbine and therefore the turbine inlet 15A receives the combustion gases along a direction being mainly axial relative to the central axis A. To redirect the combustion gases from a direction being mainly radial to a direction being mainly axial, the aircraft engine 10 further includes a scroll case 20 that regulates and reorients the combustion gases so that they meet an upstream most of the stages of the turbine 15 at the most appropriate angle of attack. In the embodiment shown, the flow of combustion gases exiting the scroll case 20 meets a first stage rotor 15C of the turbine 15 before meeting a stator thereof. The scroll case 20 may therefore be used to adequately orient the combustion gases at the most appropriate angle to meet the upstream-most airfoils of the turbine 15, which are herein part of one of the first stage rotors 15C.

Figure 3:
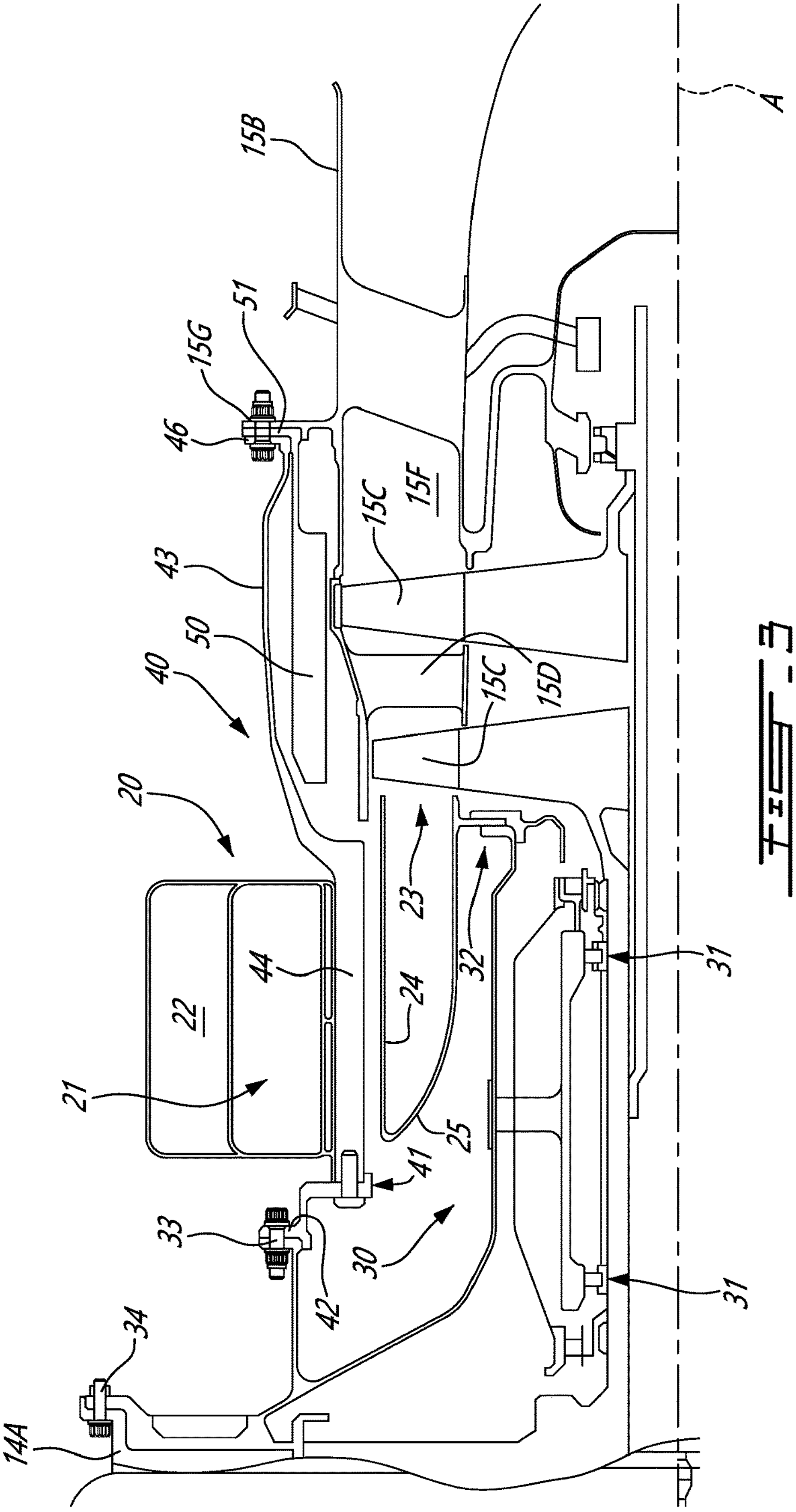
FIG. 3 is an enlarged view of a portion of FIG. 2.

Referring to FIG. 3, as shown in the exemplified embodiment, the scroll case 20 may be provided in form of a unitary body or mono-case comprising a conduit 21 extending around the central axis A from an inlet 22 to an outlet 23. The inlet 22 is fluidly connected to the combustion engine exhaust pipe 19, whereas the outlet 23 is fluidly connected to the turbine inlet 15A (FIG. 2) of the turbine 15. According to the illustrated embodiment, the inlet 22 of the conduit 21 has a tangential component and the outlet 23 is an annular outlet facing axially in a rearward direction and in alignment with an annular gas path 15F of the turbine 15. This configuration allows injecting the combustion gases in a direction being mainly axial relative to the central axis A to meet the axial inlet of the turbine 15. Vanes 24 may be provided in the conduit 21 to direct and regulate the flow of combustion gases. The vanes 24 may be omitted in some embodiments. The conduit 21 of the scroll case 20 is in this embodiment disposed axially forwardly of the turbine 15.

The conduit 21 comprises a non-axisymmetric portion extending downstream from the inlet 22 and spiraling towards the central axis A. As it progresses circumferentially around the central axis A, the non-axisymmetric portion of the conduit 21 transitions or merges with an axisymmetric portion, which forms a 360 degrees axisymmetric structure around the central axis A. The axisymmetric portion extends downstream from the non-axisymmetric portion to the outlet 23.

The inventors have found that in engine running conditions, the thermal distortions are non-uniform in the non-axisymmetric portion of the scroll case 20. Consequently, using the scroll case 20 to secure the turbine exhaust case 15B may increase tip clearance of the rotors 15C of the turbine 15. In other words, radial thermal growth of the scroll case 20 during use of the engine may move the turbine exhaust case 15B radially outwardly, thus pulling radially on shrouds disposed around the rotors 15C. This may increase tip clearance and, as a result, may impair performance.

As illustrated on FIG. 3, a compressor case 14A of the compressor 14 is radially supported by a bearing housing 30. It will be appreciated that that any suitable support structure may be used for support the compressor case 14A. For instance, the support structure may be any static component of the engine, such as a support flange and so on. Bearings 31 are rollingly engaged to the bearing housing 30 and radially support a shaft of the engine. The scroll case 20 is secured to a rear end 32 of the bearing housing 30. In the exemplified embodiment, the scroll case 20 has a radially-inner wall 25 that defines a flange at its rear end. The flange of the radially-inner wall 25 is received within an annular groove defined by the rear end 32 of the bearing housing 30. Other configurations are however contemplated. Therefore, the scroll case 20 may not rely on the turbine exhaust case 15B for structural support.

In the disclosed embodiment, a turbine support case 40 is used to secure the turbine exhaust case 15B to the compressor case 14A of the compressor 14. As will be explained below, the turbine support case 40 is independent from the scroll case 20 such that thermal growth of the scroll case 20 may not be transmitted to the turbine exhaust case 15B. Therefore, the turbine exhaust case 15B is secured to the compressor case 14A via the turbine support case 40 independently of the scroll case 20. In the present disclosure, the expression "independent" or "independently" in "independently of the scroll case 20" implies that a load path extends from the compressor case 14A to the turbine exhaust case 15B through the turbine support case 40 without intersecting the scroll case 20. The scroll case 20 is therefore free from intersection to the load path from the compressor case 14A to the turbine exhaust case 15B. The scroll case 20 is thus not part of the load path from the compressor case 14A to the turbine exhaust case 15B and loads generated by the turbine 15 on the turbine exhaust case 15B are transmitted to the compressor case 14B via the turbine support case 40 without assistance from the scroll case 20. The scroll case 20 is thus outside the load path that extends through the turbine support case 40. The scroll case 20 may thus be structurally floating relative to the turbine support case 40.

Figure 4:
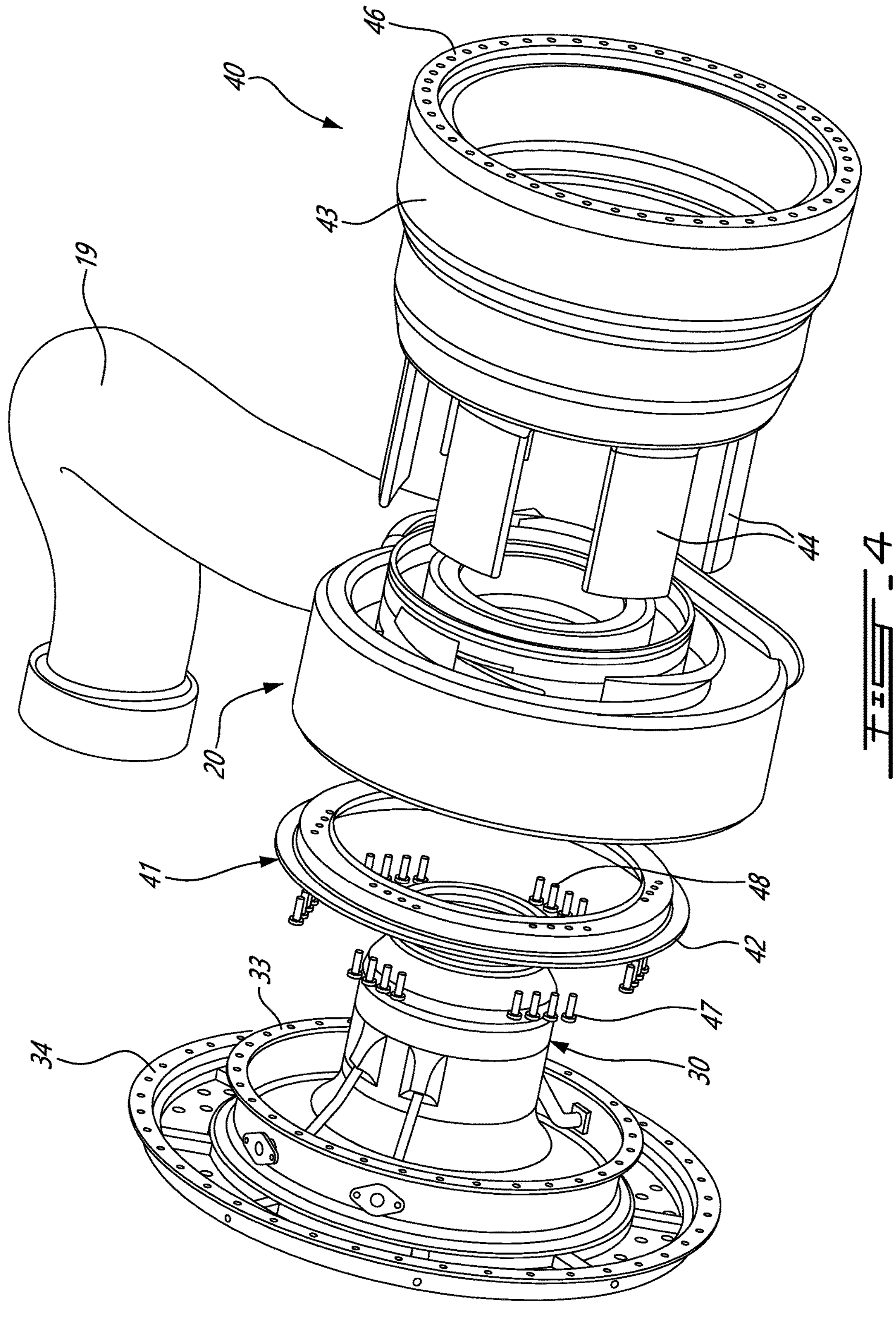
FIG. 4 is a three dimensional exploded view of a turbine assembly for the aircraft engine of FIG. 1, including a bearing housing, a scroll case, and a turbine support case.

Referring to FIG. 4, the turbine support case 40 has a portion that axially overlaps the scroll case 20 and is secured to an annular member 41, which is itself secured to the bearing housing 30 or any other suitable support structure. More specifically, the annular member 41 has a flange 42 secured (e.g., bolted) to a first flange 33 of the bearing housing 30. The bearing housing 30 further has a second flange 34, which may be disposed radially outwardly of the first flange 33 and axially offset from the first flange 33, for being secured (e.g., bolted) to a mating flange of the compressor case 14A.

Figure 5:
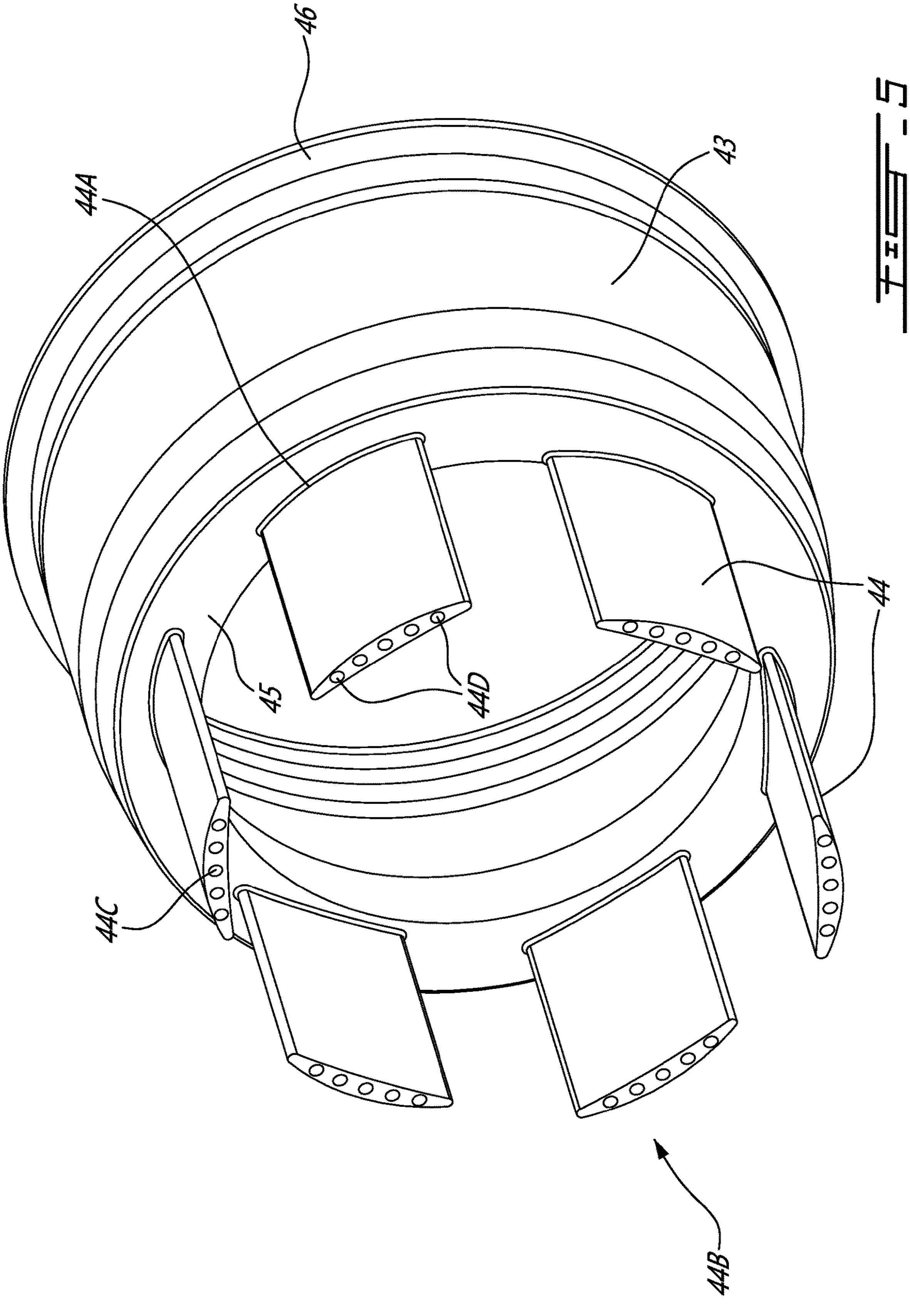
FIG. 5 is a three dimensional view of the turbine support case of FIG. 4.

Referring to FIGS. 4-5, the turbine support case 40 includes a wall 43 extending around the central axis A. The wall 43 may be cylindrical, frustoconical, or any other suitable shape. The wall 43 may extend a full circumference around the central axis A. The turbine support case 40 further includes spokes 44 protruding from the wall 43. More specifically, the turbine support case 40 includes an annular axial wall 45 extending radially inwardly from the wall 43. The spokes 44 protrude in a direction having an axial component relative to the central axis A from the annular axial wall 45 and away from the wall 43. The spokes 44 may be parallel to the central axis A. An annular flange 46 is secured to a rear end of the wall 43 and is secured (e.g., bolted) to a mating flange 15G (FIG. 3) of the turbine exhaust case 15B.

As shown in FIG. 3, the wall 43 axially overlaps at least a portion of the turbine 15. A containment ring 50 may be secured to the flange 15G of the turbine exhaust case 15B via containment ring flange 51, which may be sandwiched between the annular flange 46 of the turbine support case 40 and the flange 15G of the turbine exhaust case 15B. The containment ring 50 is, in this embodiment, disposed radially between the wall 43 of the turbine support case 40 and at least one of the rotors 15C of the turbine 15.

As shown in FIG. 5, the spokes 44, six in this embodiment, but more or less may be used, extend from proximal ends 44A at the annular axial wall 45 to distal ends 44B. The distal ends 44B of the spokes 44 are secured to the annular member 41 as will be explained further below. The distal ends 44B of the spokes define threaded apertures 44C and pin apertures 44D. The threaded apertures 44C may be disposed between two pin apertures 44D, but other configurations are contemplated. For instance, only one or more threaded apertures may be used. Similarly, only one or more pin apertures may be used. The pin apertures 44D are sized to receive pins 47 (FIG. 4) that extend through correspondingly-shaped apertures defined through the annular member 41 and used for locating the annular member 41 to the turbine support case 40. Then, fasteners 48 (e.g., bolts) (FIG. 4) extend through correspondingly-shaped apertures defined through the annular member 41 and are threadingly engaged to the threaded apertures 44C for securing the spokes 44 to the annular member 41, which is itself secured to the bearing housing 30.

Figure 6:
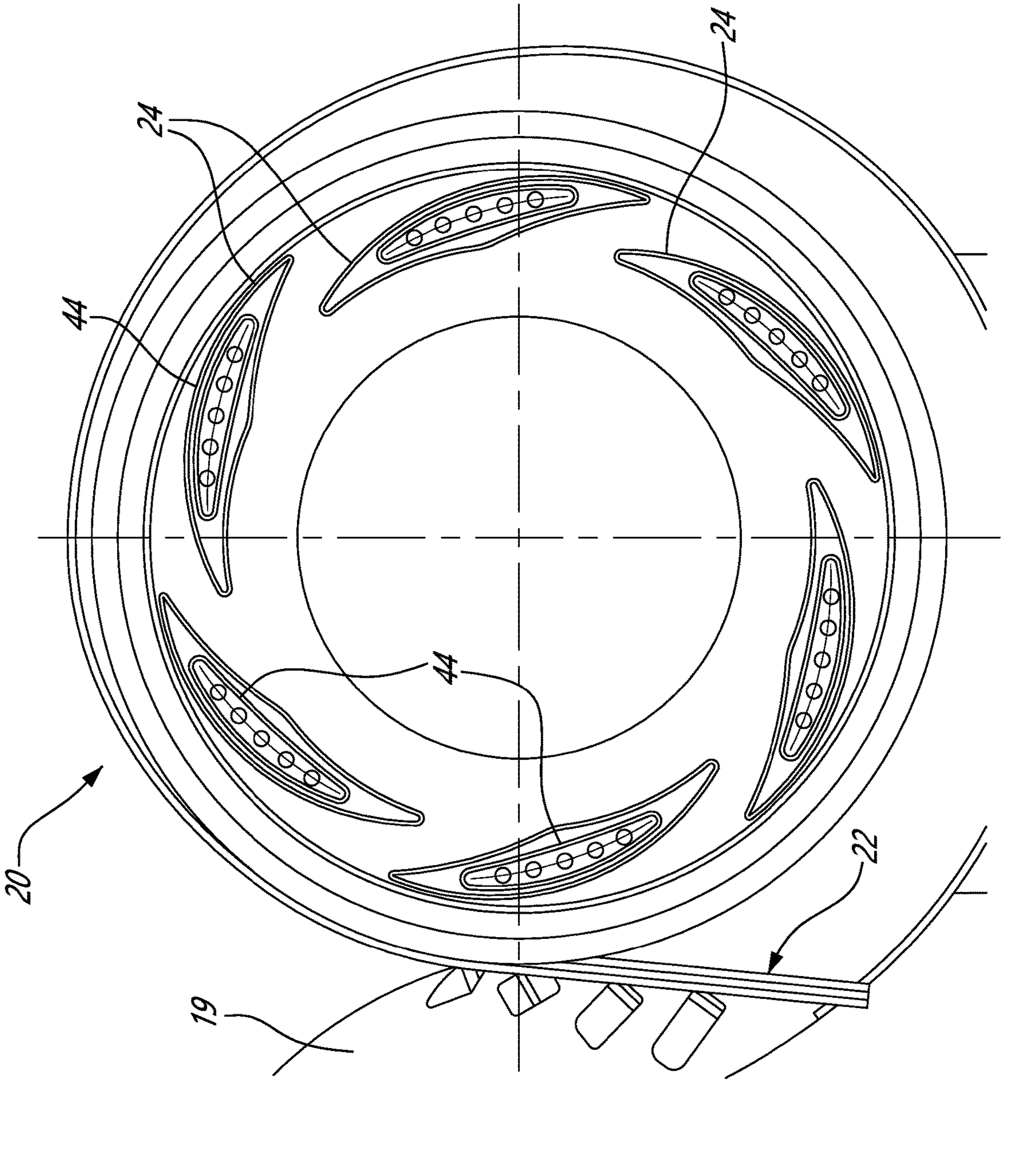
FIG. 6 is a cross-sectional view taken on a plane normal to a central axis of the aircraft engine of FIG. 1, illustrating the turbine support case and the scroll case.

Referring to FIGS. 4 and 6, in the embodiment shown, each of the spokes 44 is received within a respective one of the vanes 24 of the scroll case 20. The spokes 44 therefore axially overlap the vanes 24. Thus, the spokes 44 may be isolated from combustion gases flowing through the scroll case 20 by the vanes 24. The spokes 44 may be free of connection to the vanes 24. In other words, outer surfaces of the spokes 44 may be free of contact with inner surfaces of the vanes 24. The vanes 24 may move axially, radially, and/or circumferentially relative to the spokes 44 without transferring any forces to the spokes 44, and vice versa. Put differently, the scroll case 20 is free from direct connection to the turbine support case 40. In other words, the scroll case 20 is free of contact, attachment, so on with the turbine support case 40. The spokes 44 of this embodiment have an elongated, airfoil-like shape to substantially match a shape of the vanes 24. However, the shape of the spokes 44 may be different. The spokes 44 may be circular, oval, square, rectangular in cross-section and so on, without departing from the scope of the present disclosure.

Figure 7:
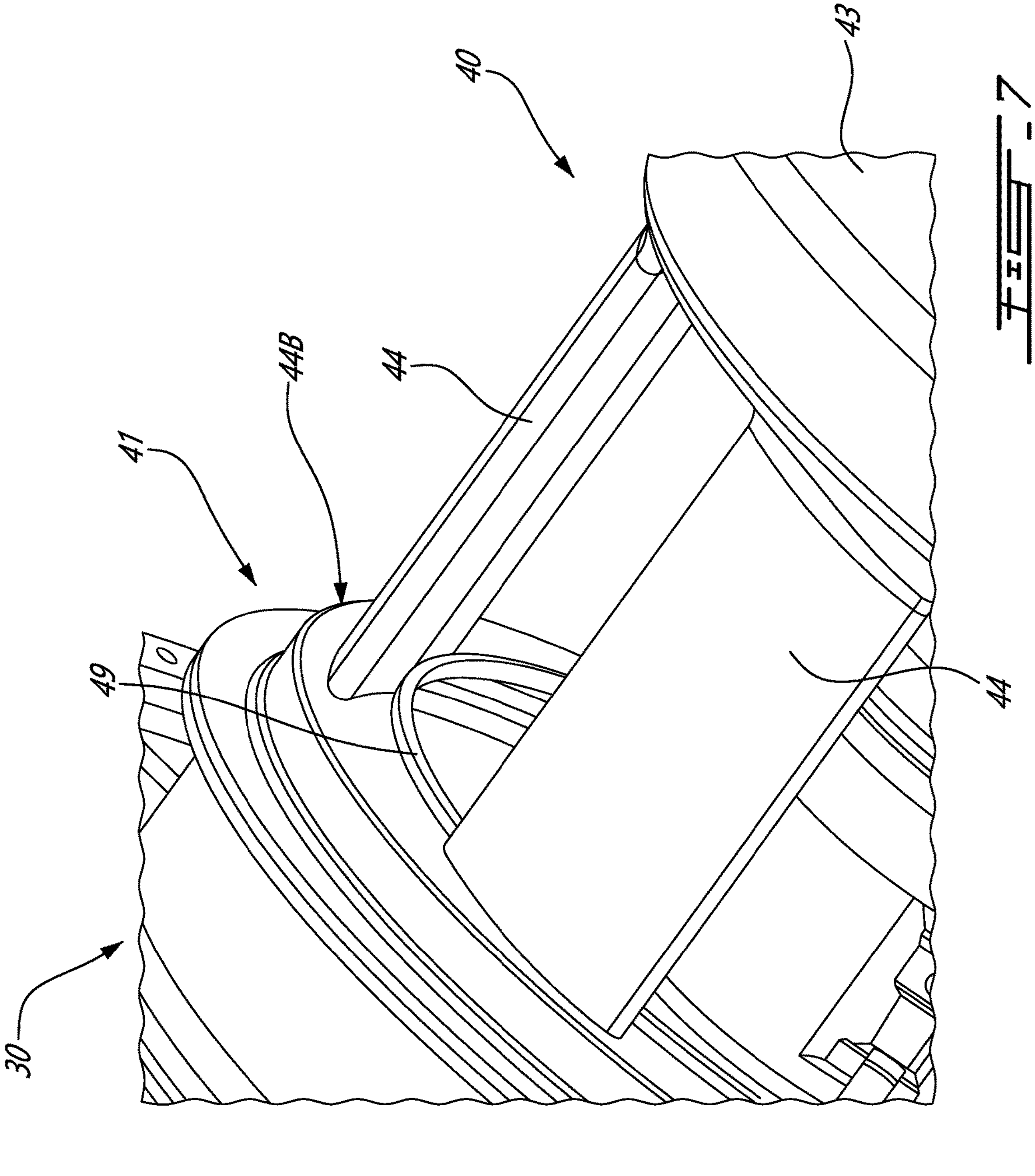
FIG. 7 is a partial three dimensional view of the turbine exhaust case secured to an annular member.

Referring now to FIG. 7, the turbine support case 40 is shown secured to the annular member 41. The distal ends 44B of the turbine support case 40 are radially supported by the annular member 41. More specifically, the annular member 41 defines a peripheral tab 49 that protrudes axially relative to a remainder of the annular member 41 and towards the turbine exhaust case 15B. The peripheral tab 49 defines a radially-outwardly facing abutment face against which the distal ends 44B of the spokes 44 are supported. Movements of the distal ends 44B of the spokes 44 towards the central axis A are prevented by the peripheral tab 49. Said differently, a spoke interface may be created by a spigot interface machined at the end of the spoke to radially position the structure.

Figure 8:
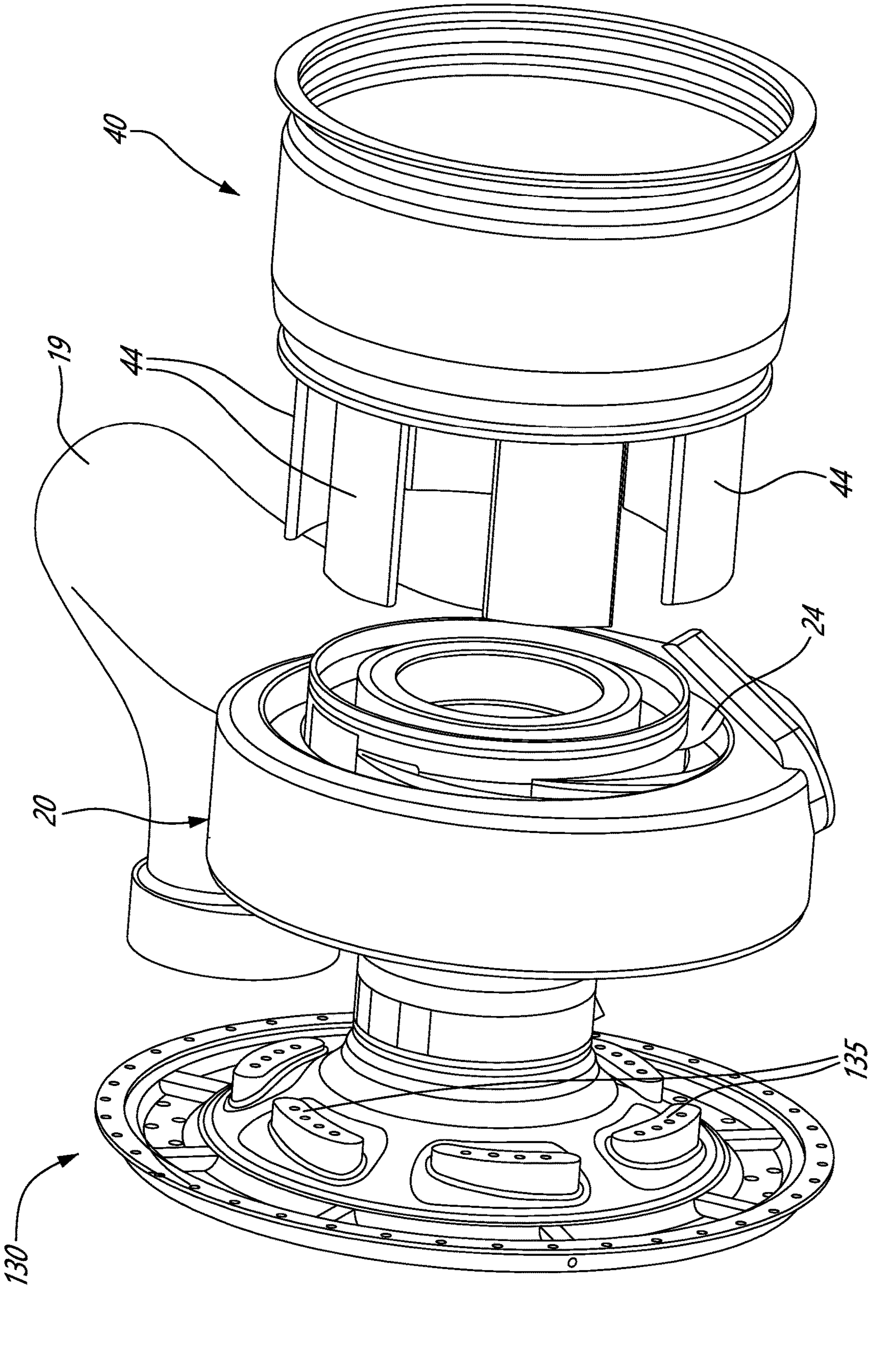
FIG. 8 is a three dimensional exploded view of a turbine assembly in accordance with another embodiment.
Figure 9:
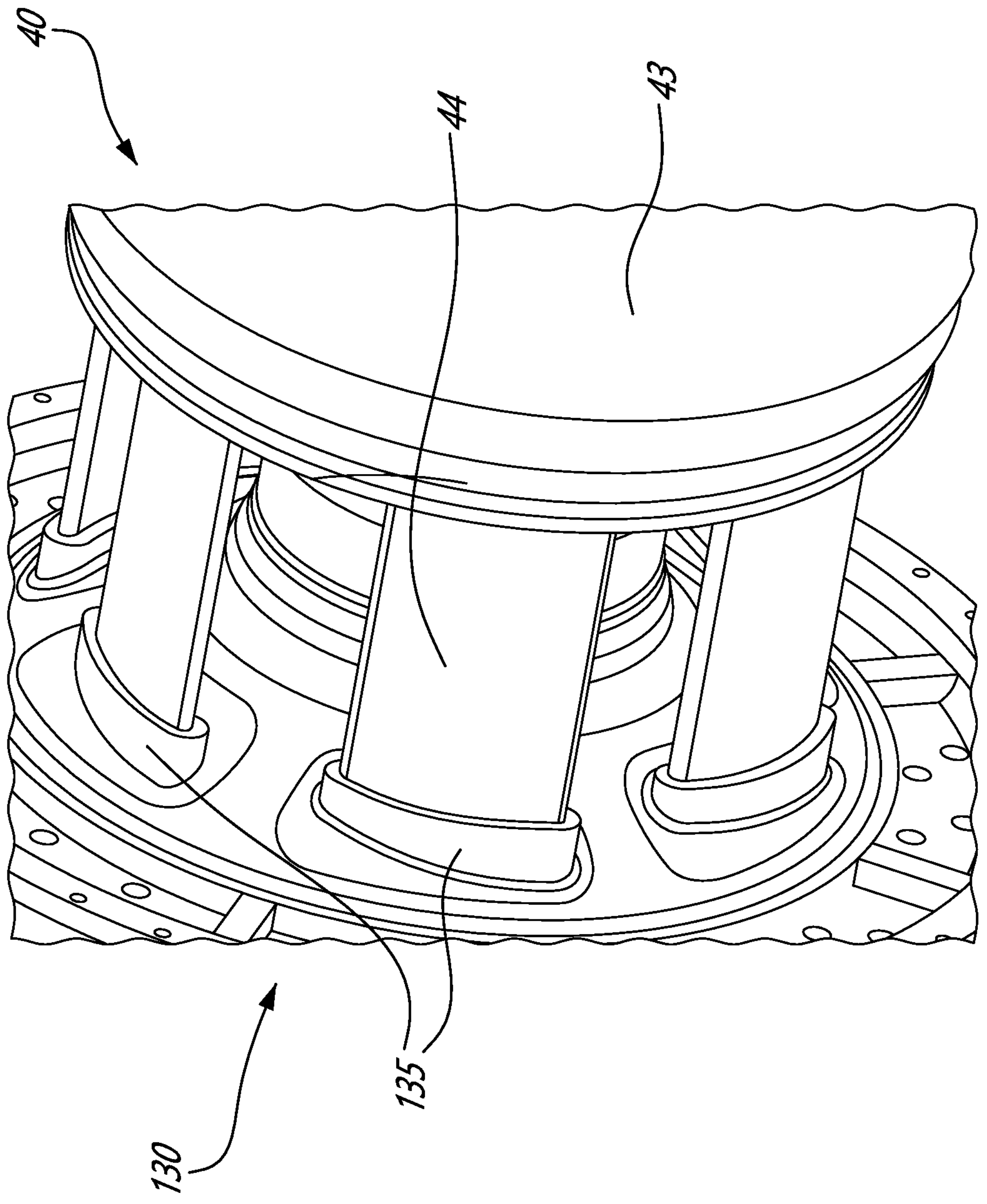
FIG. 9 is a partial three dimensional view of the turbine assembly of FIG. 8 illustrating the turbine support case and the bearing housing in accordance with another embodiment.
Figure 10:
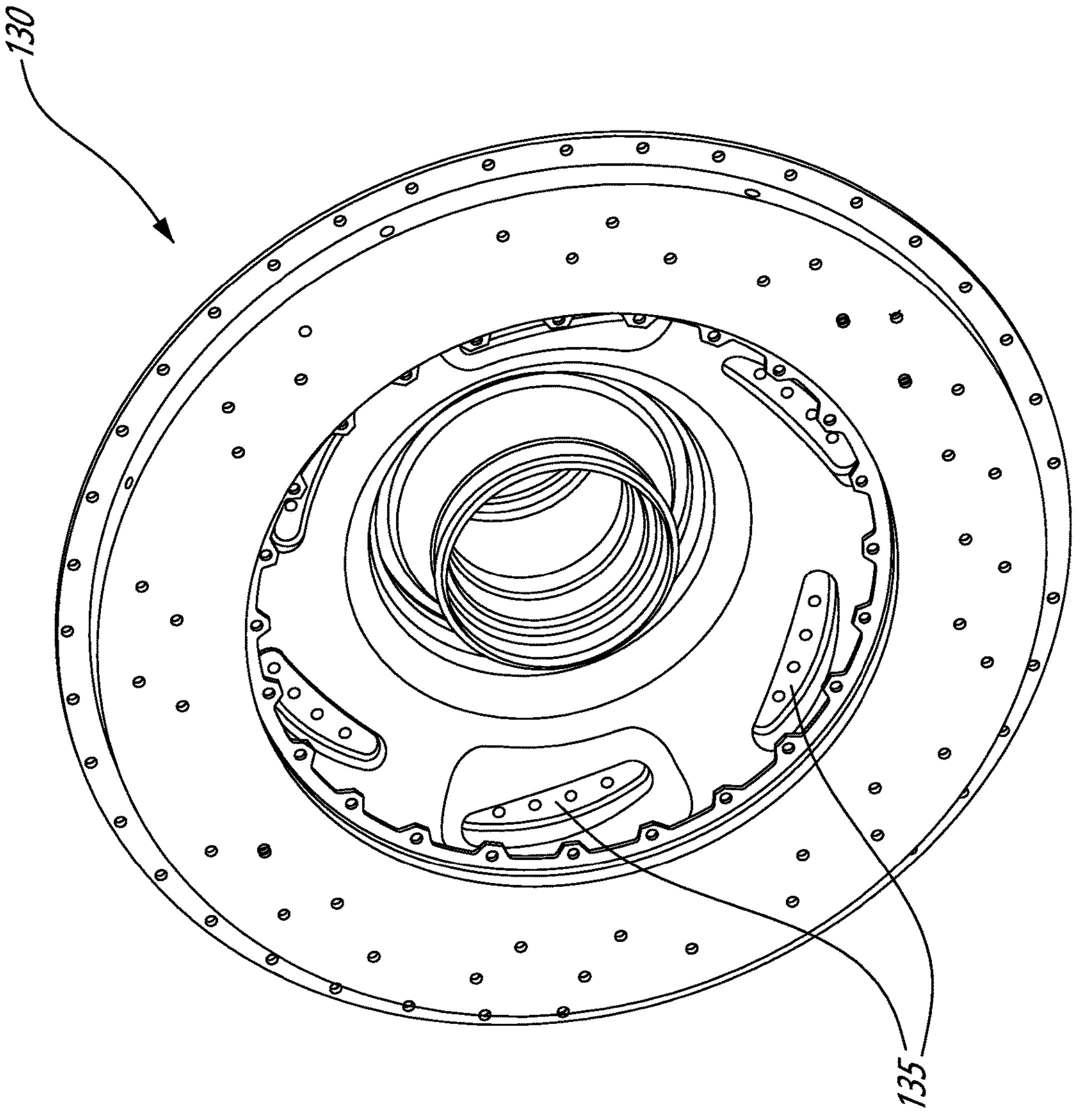
FIG. 10 is a front side of the bearing housing of FIG. 8.

Referring now to FIGS. 8-10, another way of securing the turbine support case 40 to the bearing housing is illustrated. For the sake of conciseness, only feature differing from the configuration described above are described below.

In the exemplified embodiment, the bearing housing 130 defines bosses 135 that protrude from an annular wall of the bearing housing 130 towards the scroll case 20. The distal ends 44B of the spokes 44 are secured to the bosses 135 of the bearing housing 130. Each of the distal ends 44B may define an axial abutment with a respective one of the bosses 135. Then, as shown in FIG. 10, the distal ends 44B of the spokes may be secured to the bosses 135 via fasteners received through correspondingly-shaped aperture defined through the bosses 135 and threadingly engaged to the threaded apertures of the distal ends 44B of the spokes 44.

The disclosed turbine support case may provide a compact design that extends through the housing of the scroll case instead of being cantilevered; it may improve engine efficiency by keeping the tip clearance within a given threshold in operation since radial expansion of the scroll case 20 is not transmitted to the turbine exhaust case 15B, which support shrouds of the rotors; and it may reduce weight.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
- a turbine including a turbine rotor rotatable about a central axis;
- a scroll case having an inlet fluidly connected to a source of combustion gases and an outlet fluidly connected to the turbine, and a conduit extending around the central axis from the inlet to the outlet, the conduit spiraling towards the central axis;
- a bearing housing extending around the central axis; an exhaust case disposed downstream of the turbine; and
- a turbine support case secured to the bearing housing and to the exhaust case, the turbine support case having spokes distributed around the central axis and extending along a direction having an axial component relative to the central axis, each of the spokes extending through the conduit of the scroll case and radially supported by the bearing housing.

2. The aircraft engine of claim 1, wherein the scroll case includes vanes extending in a direction having an axial component relative to the central axis and across the conduit.

3. The aircraft engine of claim 2, wherein each of the spokes extends within a respective one of the vanes.

4. The aircraft engine of claim 3, wherein each of the spokes are free of connection to the respective one of the vanes.

5. The aircraft engine of claim 1, wherein the turbine support case defines a load path from the bearing housing to the exhaust case, the load path is independent from the scroll case.

6. The aircraft engine of claim 1, wherein the scroll case is free from direct connection to the turbine support case.

7. The aircraft engine of claim 1, comprising an annular member secured to the bearing housing and extending around the central axis, distal ends of each of the spokes are secured to the annular member.

8. The aircraft engine of claim 7, wherein the annular member includes a peripheral tab extending axially relative to the central axis, each of the distal ends of each of the spokes are radially supported by the peripheral tab.

9. The aircraft engine of claim 1, wherein the turbine support case includes a wall extending around the central axis, each of the spokes protruding from the wall.

10. The aircraft engine of claim 9, wherein the wall axially overlaps at least a portion of the turbine, the turbine support case having a rear flange secured to a flange of the exhaust case.

11. The aircraft engine of claim 10, comprising a containment ring secured to the rear flange of the turbine support case and disposed radially between the wall of the turbine support case and the turbine rotor of the turbine.

12. The aircraft engine of claim 1, wherein the turbine is an axial turbine having an axial inlet, and wherein the outlet of the scroll case is annular and axially faces the axial inlet of the turbine, the conduit of the scroll case being disposed axially forwardly of the turbine.

13. A turbine assembly, comprising:
- a turbine including a turbine rotor rotatable about a central axis;
- a support structure;
- a scroll case for receiving combustion gases and for directing the combustion gases to the turbine, the scroll case having a conduit extending around the central axis, the conduit spiraling towards the central axis; and
- a turbine support case having spokes distributed around the central axis, each of the spokes extending through the conduit of the scroll case and radially supported by the support structure, wherein a load path extends through the turbine support case independently of the scroll case.

14. The turbine assembly of claim 13, wherein the scroll case includes vanes extending in a direction having an axial component relative to the central axis across the conduit.

15. The turbine assembly of claim 14, wherein each of the spokes extends within a respective one of the vanes.

16. The turbine assembly of claim 15, wherein each of the spokes are free of connection to the respective one of the vanes.

17. The turbine assembly of claim 13, wherein the scroll case is free from direct connection to the turbine support case.

18. The turbine assembly of claim 13, comprising an annular member secured to the support structure and extending around the central axis, distal ends of each of the spokes radially secured to the annular member.

19. The turbine assembly of claim 18, wherein the annular member includes a peripheral flange extending axially relative to the central axis, each of the distal ends of each of the spokes radially supported by the peripheral flange.

20. The turbine assembly of claim 13, wherein the turbine support case includes a wall extending around the central axis, each of the spokes protruding from the wall.

* * * * *